(12) United States Patent
Gargi et al.

(10) Patent No.: US 8,959,540 B1
(45) Date of Patent: Feb. 17, 2015

(54) PREDICTING ENGAGEMENT IN VIDEO CONTENT

(75) Inventors: Ullas Gargi, Los Altos, CA (US); Jay Yagnik, Mountain View, CA (US); Anindya Sarkar, Goleta, CA (US)

(73) Assignee: Google Inc., Mountain View, CA (US)

( * ) Notice: Subject to any disclaimer, the term of this patent is extended or adjusted under 35 U.S.C. 154(b) by 631 days.

(21) Appl. No.: 12/783,524

(22) Filed: May 19, 2010

Related U.S. Application Data

(60) Provisional application No. 61/181,569, filed on May 27, 2009.

(51) Int. Cl.
  *H04N 7/16* (2011.01)
  *H04H 60/32* (2008.01)

(52) U.S. Cl.
  USPC .................................................. 725/9; 725/19

(58) Field of Classification Search
  None
  See application file for complete search history.

(56) References Cited

U.S. PATENT DOCUMENTS

| | | | |
|---|---|---|---|
| 8,090,694 B2* | 1/2012 | Shahraray et al. | 707/673 |
| 2005/0132401 A1* | 6/2005 | Boccon-Gibod et al. | 725/34 |
| 2007/0118848 A1* | 5/2007 | Schwesinger et al. | 725/9 |
| 2007/0157242 A1* | 7/2007 | Cordray et al. | 725/46 |
| 2008/0066107 A1 | 3/2008 | Moonka et al. | |
| 2008/0091512 A1* | 4/2008 | Marci et al. | 705/10 |
| 2010/0082614 A1* | 4/2010 | Yang et al. | 707/726 |

FOREIGN PATENT DOCUMENTS

| | | |
|---|---|---|
| WO | WO 99/52285 A1 | 10/1999 |
| WO | WO 01/58154 A2 | 8/2001 |
| WO | WO 03/050731 A2 | 6/2003 |
| WO | WO 2005/010702 A2 | 2/2005 |
| WO | WO 2006/127645 A2 | 11/2006 |

OTHER PUBLICATIONS

"Welcome to Zunavision," Zunavision, 2009, 1 page [online] [Retrieved on Jul. 21, 2009] Retrieved from the Internet <URL:http://www.zunavision.com/>.
"Zunavision," Posted on YouTube, 2009, 1 page [online] [Retrieved on Jul. 21, 2009] Retrieved from the Internet <URL:http://www.youtube.com/watch?v=eNyXwC5YUsc>.
Felzenszwalb, P., et al., "Efficient Graph-Based Image Segmentation," International Journal of Computer Vision, Sep. 2004, 26 pages, vol. 59, No. 2.

(Continued)

*Primary Examiner* — Jason K Lin
(74) *Attorney, Agent, or Firm* — Fenwick & West LLP

(57) ABSTRACT

User engagement in unwatched videos is predicted by collecting and aggregating data describing user engagement with watched videos. The data are normalized to reduce the influence of factors other than the content of the videos on user engagement. Engagement metrics are calculated for segments of watched videos that indicate user engagement with each segment relative to overall user engagement with the watched videos. Features of the watched videos within time windows are characterized, and a function is learned that relates the features of the videos within the time windows to the engagement metrics for the time windows. The features of a time window of an unwatched video are characterized, and the learned function is applied to the features to predict user engagement to the time window of the unwatched video. The unwatched video can be enhanced based on the predicted user engagement.

19 Claims, 6 Drawing Sheets

(56) References Cited

OTHER PUBLICATIONS

Li, L., et al., "Foreground Object Detection From Videos Containing Complex background," ACM-MM, Nov. 2003, pp. 2-10.

Ooyala Inc., "Use Video Analytics to Drive Growth," 7 pages, [online] [retrieved on Aug. 31, 2010] Retrieved from the Internet <URL:http://www.ooyala.com/videoplatform/analytics>.

Bohus, D., et al., "Learning to Predict Engagement with a Spoken Dialog System in Open-World Settings," Proceedings of SIGDIAL 2009: the 10th Annual Meeting of the Special Interest Group in Discourse and Dialogue, Sep. 2009, pp. 244-252.

Cooper, M., et al., "Video Segmentation via Temporal Pattern Classification," IEEE Transactions on Multimedia, 9(3):610-618 (Apr. 2007).

Gargi, U., et al., "Performance Characterization of Video-Shot-Change Detection Methods," IEEE Transactions on Circuits and Systems for Video Technology, 10(1): 1-13 (Feb. 2000).

PCT International Search Report and Written Opinion for International Application No. PCT/US2008/060997, dated Oct. 13, 2008, 8 pages.

International Preliminary Report on Patentability from International Application PCT/US2008/060997, Oct. 13, 2008, 6 pages.

\* cited by examiner ns of times), such that the video server 110 has a substantial amount of statistics describing user engagement with

PREDICTING ENGAGEMENT IN VIDEO CONTENT

CROSS-REFERENCE TO RELATED APPLICATION

This application claims the benefit of provisional Application No. 61/181,569, filed May 27, 2009, which is incorporated by reference herein.

BACKGROUND

1. Field of the Invention

This invention generally relates to analyzing video content and more specifically to predicting user engagement with the content.

2. Description of the Related Art

The sharing of video content on websites has developed into a worldwide phenomenon, supported by dozens of websites. On average, over 10,000 videos are posted every day, and this number is increasing as the tools and opportunities for capturing video become easier to use and more widespread. Millions of people watch the posted videos.

Operators of video sharing websites have a general desire to improve the experiences of the viewers of the shared videos. For example, the viewer experience can be improved by inserting content such as recommendations for additional videos or other items of interest into the watched video. Determining when to insert such content is a difficult problem because the content, if provided at the wrong times, can be distracting and harm the viewer experience. Accordingly, it is important to identify portions of the video where it might be appropriate to insert content or perform other actions that can improve the viewer experience. However, video content contains very few identifying markers that can be used to differentiate among the different portions of a video.

Thus, while there is a desire to improve the viewer experience, determining how to improve the experience for a given video is difficult. The problem is especially acute when multiplied by the thousands of new videos received every day by video sharing sites.

SUMMARY

The above and other needs are met by a method, computer-readable storage medium, and computer system for predicting user engagement for a portion of an unwatched video. Embodiments of the method comprise determining engagement metrics indicating user engagement with portions of watched videos and characterizing features of the portions of the watched videos. The method further comprises determining a relationship between the characterized features of the portions of the watched videos and the engagement metrics of the portions of the watched videos. The method also characterizes features of the portion of the unwatched video and predicts an engagement metric for the portion of the unwatched video based at least in part on the characterized features of the portion of the unwatched video and the determined relationship between the characterized features of the portions of the watched videos and the engagement metrics of the portions of the watched videos. The predicted engagement metric for the portion of the unwatched video is stored.

Embodiments of the computer-readable storage medium store computer-executable instructions for performing the steps described above. Embodiments of the computer system further comprise a processor for executing the computer-executable instructions.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
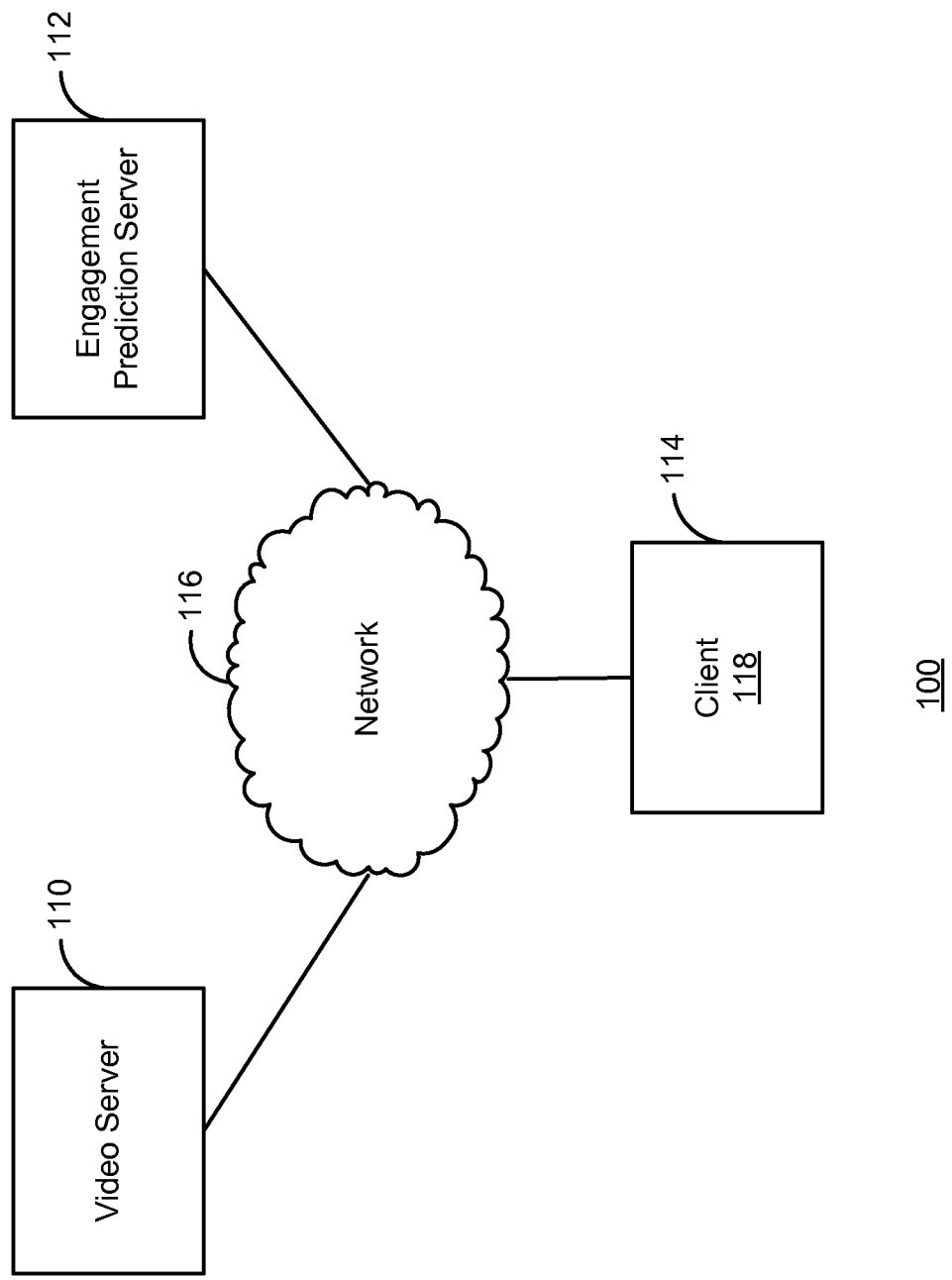
FIG. 1 is a high-level block diagram of a computing environment according to one embodiment.

FIG. 1 is a high-level block diagram of a computing environment 100 according to one embodiment. FIG. 1 illustrates a video server 110, an engagement prediction server 112 (the "prediction server") and a client 114 connected by a network 116. Only one client 114 is shown in FIG. 1 in order to simplify and clarify the description. Embodiments of the computing environment 100 can have thousands or millions of clients 114, as well as multiple video 110 and prediction servers 112.

The video server 110 serves video content (referred to herein as "videos") to clients 114 via the network 116. In one embodiment, the video server 110 is located at a website provided by YOUTUBE, LLC of San Bruno, Calif., although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, and serve videos posted by users of the clients 114 and by other sources.

The video server 110 maintains statistics describing user interactions with served videos. The statistics include coarse-grained statistics such as the number of times a given video has been watched. In addition, the statistics include fine-grained statistics such as the number of times given portions within the video have been watched. Thus, the statistics describe aspects such as which portions of the video are frequently watched, which portions are rewound and re-watched, which portions are often skipped, and at which portions users tend to disengage with the video and move on to other videos or other tasks.

The prediction server 112 analyzes videos stored by the video server 110 to predict user engagement with portions of the videos. Said another way, the prediction server 112 identifies portions of videos that users are likely to find less engaging (i.e., boring) and portions that users are likely to find more engaging (i.e., interesting). In order to generate the predictions, the prediction server 112 classifies the videos stored by the video server 110 into "watched videos" and "unwatched videos." A watched video is one that has been viewed by a large number of users (e.g., thousands or millio of viewers). An unwatched video, in contrast, is one that has been viewed by only few, if any users. Thus, the number of views of an unwatched video will typically be significantly smaller than the number of views of a watched video.

The prediction server 112 predicts user engagement in unwatched videos by analyzing statistics regarding watched videos. The prediction server 112 uses the statistics to identify portions of the watched videos that have particularly high or low user engagement. The prediction server 112 characterizes the features of the video portions having the high and low engagement and uses machine learning to identify relationships between the features and the engagement.

The prediction server 112 characterizes the features of portions of an unwatched video and predicts, based on the learned relationships between features and engagement, whether any portions of the unwatched video are likely to have low or high engagement. The prediction server 112 stores these predictions in association with the video. The prediction server 112, video server 110 or another entity can subsequently use the predicted engagement to enhance the user experience. For example, the prediction server 112 can select a representative image or segment for the video from a portion of high predicted engagement, and can offer recommendations for other videos or provide other advertising during a portion of low predicted engagement.

The client 114 is a computer or other electronic device used by one or more users to perform activities including viewing video and other content received from the video server 110. The client 114, for example, can be a personal computer executing a web browser 118 that allows the user to browse and search for video content available at the video server web site. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
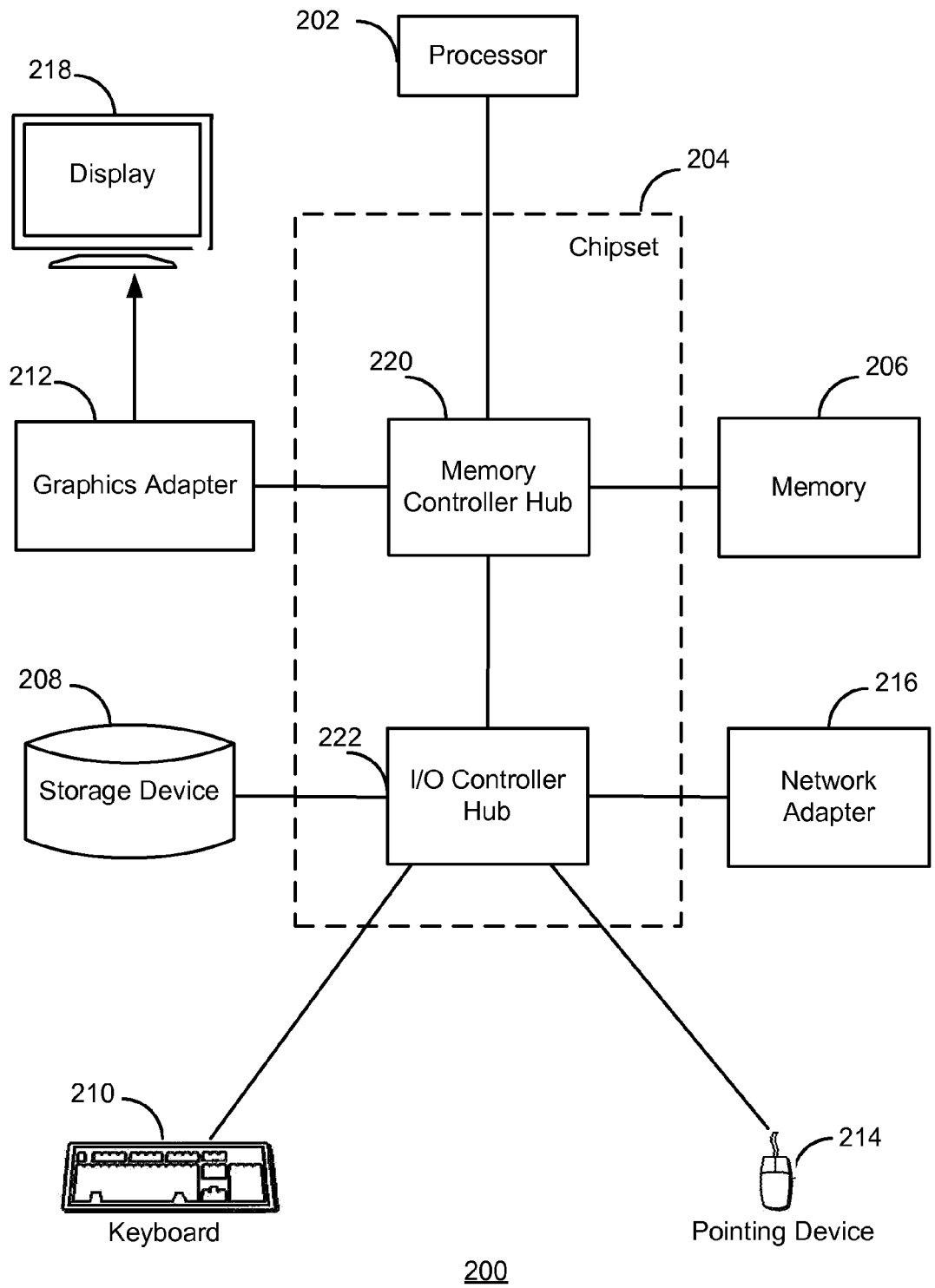
FIG. 2 is a high-level block diagram illustrating an example of a computer for use as a video server, prediction server, and/or client.

FIG. 2 is a high-level block diagram illustrating an example of a computer 200 for use as a video server 110, prediction server 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The video server 110, in contrast, may comprise multiple blade servers working together to provide the functionality described herein.

Figure 3:
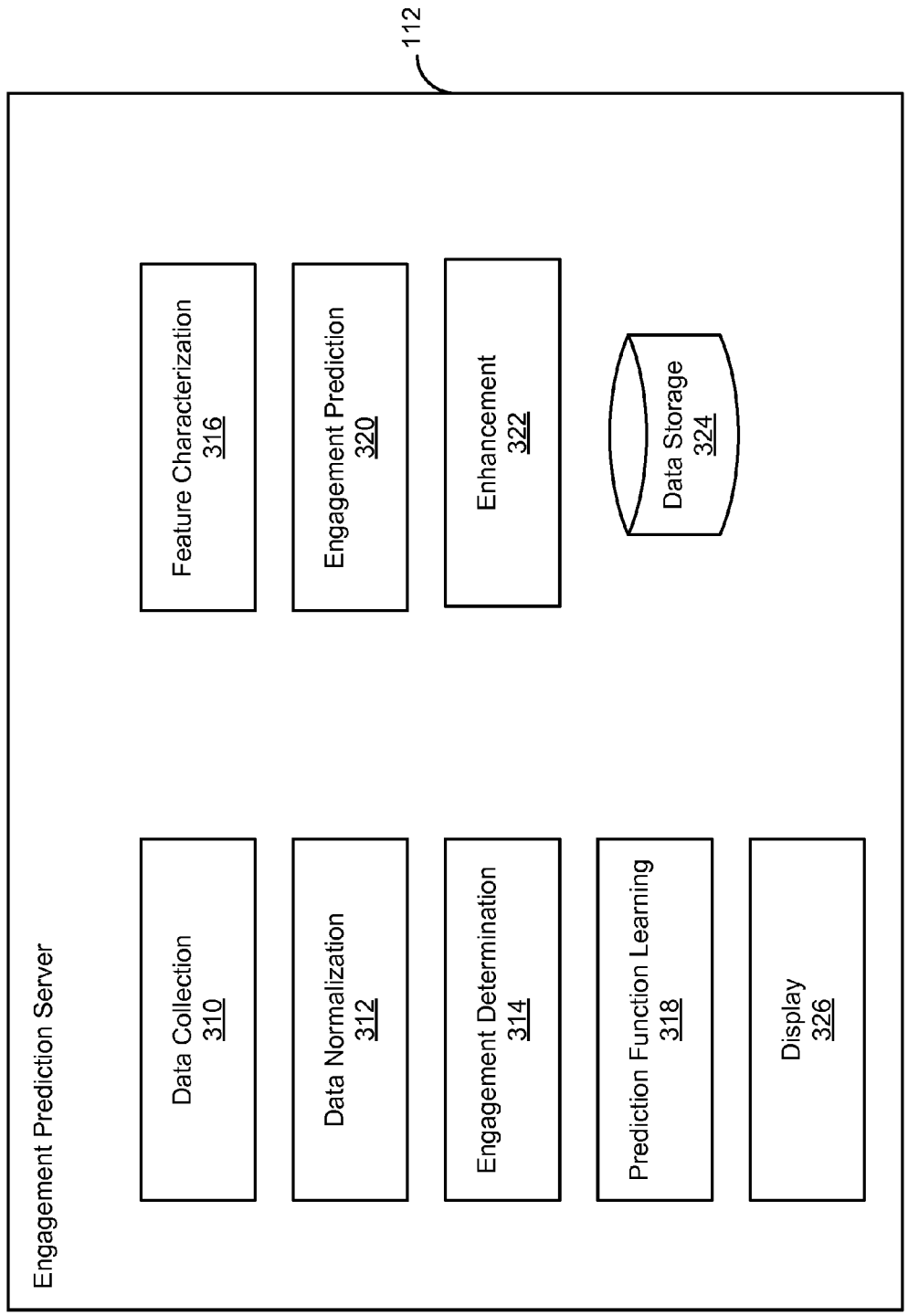
FIG. 3 is a high-level block diagram illustrating modules within the prediction server according to one embodiment.

FIG. 3 is a high-level block diagram illustrating modules within the prediction server 112 according to one embodiment. Some embodiments of the prediction server 110 have different and/or additional modules than the ones described here. Similarly, the functions can be distributed among the modules in a different manner than is described here. Certain modules and functions can be incorporated into other modules of the prediction server 112 and/or other entities on the network 116, including the video server 110 and client 114.

A data collection module 310 collects log data for watched videos. The video server 110 can provide clients 114 with a video player program, such as an ADOBE FLASH browser plug-in, that is instrumented to log user interactions with the video server 110 and served videos. The player program can be configured to log data describing the segments of videos that are watched by the user of the client 114. A "segment," as used herein, is a quantum of a watched video, such as a one or five second portion of the video. The logged data can indicate, for example, that the user watched the first five seconds of a video, then skipped forward two minutes, then skipped backward and watched a segment starting one minute into the video three times. The player program can also log data describing the general fickleness of the user, such as whether the user tends to watch entire videos or frequently jumps within a video or among different videos. The player program can be configured to provide the log data to the video server 110 and/or to the prediction server 112. The data collection module 310 receives the data from the video server 112 and/or the player programs at the clients 114.

The data collection module 310 can also aggregate the log data across multiple users. For a given video, the aggregated log data describes the number of users who have viewed each segment of the video. Segments of the video that many users watched represent segments of high user engagement while segments that fewer users watched represent segments of low user engagement. The user engagement score for a segment of a video can be calculated as the ratio of the number of viewers of the segment to the number of viewers of the video.

The aggregated log data for a video can be conceptually viewed as a histogram with the time base for the video along the x-axis and the number of times a segment was watched (by all users) along the y-axis. For a typical video, user engagement tends to be highest at the beginning because most viewers watch the opening segments of the video. Thus, the histogram for a typical video might show high engagement for the initial segments of the video and then show a decrease over time, with occasional bumps in the interior of the graph indicating areas within the video that were watched by many users.

A data normalization module 312 normalizes the aggregate data for each video. The normalization reduces the influence of factors other than video content on user engagement. Said another way, the normalization increases the influence of a video's content on the measured user engagement for the video and decreases the influence of other factors on the engagement. The normalization also enables comparison of user engagement across multiple videos.

One embodiment of the normalization module 312 normalizes user engagement by video popularity (i.e., number of times the video is watched) and length. Highly-popular videos intrinsically have high user engagement. Therefore, the data normalization module 312 boosts (increases the influence of) popular videos. However, this boost should not unduly influence the user engagement scores because there might be reasons for the popularity that are unassociated with the content of a video.

Lengthy videos, in turn, typically lose viewership over time because viewership naturally trails off as the length of a video increases. The data normalization module 312 therefore penalizes (decreases the influence of) long videos to reduce the ability of such videos to skew the user engagement determination. Similarly, the data normalization module 312 penalizes very early segments of videos (e.g., the first five seconds) because the earliest segments are almost always watched and the user engagement of such segments is not necessarily based on the content of the segments. The data normalization module 312 can also boost or penalize based on other factors. For example, engagement data (i.e., log data) from very fickle users can be penalized while data from non-fickle users can be boosted. In addition, segments of videos in which ads or other engagement enhancements already appear can be boosted or penalized based on user reactions to the engagement enhancements. Thus, the calculated engagement of a segment of a video in which ads are known to produce high click-through rates can be boosted.

The data normalization module 312 can normalize user engagement across the time segments of a particular video ($V_j$) by dividing the raw user engagement (i.e., the ratio of the number of viewers ($N_{ij}$) of a given time segment ($S_t$) to the total viewers of the video ($T_j$)) by the prior probability ($P_t$) that a segment at time t will be watched independent of which video it is (i.e., $P_t$ is the average "watchedness" of segment $S_t$ over all videos). Written another way, the engagement can be normalized as:

$$\text{Normalized User Engagement} = \frac{N_{ij}}{T_j} \bigg/ P_t. \quad (1)$$

The above manner of normalization does not take the popularity of the video into account. The data normalization module 312 can also normalize as follows:

$$\text{Normalized User Engagement} = \log(T_j) * \frac{N_{ij}}{T_j} \bigg/ P_t. \quad (2)$$

Equation two gives more popular videos more engagement weight based on the assumption that something in the content of the videos makes them more engaging, and that "something" should be taken into account.

An engagement determination module 314 determines engagement metrics for segments of watched videos based on the normalized user engagements produced by the data normalization module 314. The engagement metric is a value that indicates the user engagement of a specific segment of a video. In one embodiment, the engagement determination module 314 calculates a mean user engagement value across all, or a specified subset, of the watched videos served by the video server 110. The engagement determination module 314 calculates a given segment's engagement metric as the difference of that segment's normalized user engagement score and the mean user engagement. Thus, a segment's engagement metric indicates how engaging the segment is relative to the average engagement of videos served by the video server. The engagement determination module 314 can also normalize the engagement metric. For example, the engagement metric can be normalized to a value between −1 and +1, where −1 is least engaging, 0 is of mean engagement, and +1 is most engaging. The end result produced by the engagement determination module 314 is an engagement metric for each segment of the watched videos.

A feature characterization module 316 characterizes features of videos. The characterized videos can include watched videos and unwatched videos. To perform the characterization, the module 316 divides a video into sampling intervals called "time windows" or simply "windows." For example, a window can be five seconds long. The feature characterization module 316 computes a feature vector for each window, where the feature vector describes the features (i.e., characteristics) of the video within the window.

The features that the feature characterization module 316 includes in the feature vector can vary depending upon the embodiment. With respect to the visual component of the video, the features can describe the frequency coefficients of the video, whether the video has a global color (e.g., is all black), the spatial arrangement of the color in the video, the visual texture of the video, the motion of pixels in the video (e.g., whether the camera is moving), etc. The feature characterization module 316 can also use image and facial recognition technology to identify features such as whether the video includes faces and whether certain people are present in the video (e.g., does the facial recognition technology recognize the presence of a specific celebrity?). With respect to the audio components of the video, the feature characterization module 316 can describe features such as a description of the audio and a classification of the audio (e.g., is the audio silence, music, human voices, etc.). Some embodiments of the feature characterization module 316 include other and/or different features in the feature vector for a window of video.

A prediction function learning module 318 (the "learning module") determines a prediction function that can be used to predict user engagement for a portion of an unwatched video. In one embodiment, the learning module 318 uses machine learning techniques to learn a function relating the engagement metrics generated by the engagement determination module 314 for segments of watched videos to the feature vectors of windows of watched videos incorporating those segments generated by the feature characterization module 316. Specifically, the learning module 318 associates the feature vectors of given windows of video with the engagement metrics of the segments within those windows, and uses these feature/metric pairs as ground truth instances for machine learning. In one embodiment, the learning module 318 uses the mean value of the engagement metrics of the segments within a window as the engagement metric for that window.

The learning module 318 can learn the function through classification. A classification function, $F_c$, is described as: $F_c(FV_t)=C_i$ where i=1 . . . n. In other words, the function classifies a feature vector t ($FV_t$) into one of n classification such as high user engagement, medium user engagement, or low user engagement. In one embodiment, the function is embodied in one or more binary classifiers, such as a classifier that distinguishes between windows of high user engagement (i.e., interesting windows) and windows that do not have high user engagement, and a classifier that distinguishes between windows of low user engagement (i.e., boring windows) and windows that do not have low user engagement.

To understand the operation of a binary classifier, consider a graph where the x-axis represents the engagement metric as measured from −1 to 1, and the y-axis represents the number of segments of watched videos having that engagement metric. One would expect a bell curve distribution because most windows would have average user engagement, with decreasing amounts of boring and interesting windows. Thresholds can be defined on the x-axis that delineate between boring and average windows, and between interesting and average windows (e.g., an engagement metric below −0.33 indicates a boring window and an engagement metric above 0.33 indicates an interesting window). The learning module 318 trains a classifier by using the boring and/or interesting windows as ground truth labels. The result of the training is a classifier that can classify a window of an unwatched video as boring or not boring, and/or a classifier that can classify the window as interesting or not interesting. Other embodiments of the learning module 318 use classifiers that classify into more than two classifications, such as a ternary classifier that distinguishes between windows of high, medium, and low user interest.

The learning module 318 can also learn the prediction function through regression. The regression function, $F_r$, is described as: $F_r(FV_t)$=Engagement_Metric(t). In other words, the function, when applied to feature vector t, produces an engagement metric for that vector. Other embodiments of the learning module 318 learn the prediction function relating feature vectors to engagement metrics using different techniques.

An engagement prediction module 320 uses the function learned by the learning module 318 to predict (determine) the engagement metric for a time window of an unwatched video. In one embodiment, the engagement prediction module 320 receives an unwatched video, such as a video recently uploaded to the video server 110, and divides it into windows, such as five second windows. The engagement prediction module 320 uses the feature characterization module 316 to produce feature vectors characterizing the windows. The engagement prediction module 320 then applies the learned function to the feature vectors to predict user engagement with the corresponding windows. In the embodiment where the learning module 318 produces one or more classifiers, the engagement prediction module 320 applies the classifiers to the windows in order to identify windows of video that have high or low predicted user engagement (or other levels of engagement supported by the classifiers).

An enhancement module 322 uses the predicted user engagement for windows of unwatched videos to enhance the experiences of users who watch the videos. For windows of video with predicted low user engagement, the enhancement module 322 can insert content designed to boost user engagement when the windows of video are played to the user. For example, the inserted content can include recommendations for other videos or content, advertisements, surveys, etc. For windows of video with predicted high user engagement, the media enhancement module 322 can similarly insert content that leverages the high user engagement to provide additional enhancement to the user. The inserted content need not be inserted directly into the video; the content can be overlaid on the video or appear on a web page displayed in connection with the video. In addition, the enhancement module 322 can select a representative image and/or segment for the video from a window with high user engagement for use as a thumbnail or perform other functions such as inserting a bookmark at the beginning of the window. Other embodiments of the enhancement module 322 use the predicted user engagements to enhance user experiences in other ways.

A data storage module 324 stores data used by the various modules of the engagement prediction server 112. The stored data include the log data received by the data collection module 310, the user engagement scores and metrics produced by the data normalization 312 and engagement determination 314 modules, and the feature vectors generated by the feature characterization module 316. In addition, the data storage module 324 stores data describing the prediction function learned by the learning module 318 and the predicted engagements generated by the predicted engagement module 320. The data storage module 324 can also store watched and unwatched videos operated upon by the prediction server 112 and data used and generated by the enhancement module 322.

A display module 326 supports display of data stored in the data storage module 324 to an administrator of the engagement prediction server 112 and/or a user of a client 114. The displayed data can appear on the display device 218. The displayed data can include predicted engagement metrics and other information describing the operation of the engagement prediction server 112.

Figure 4:
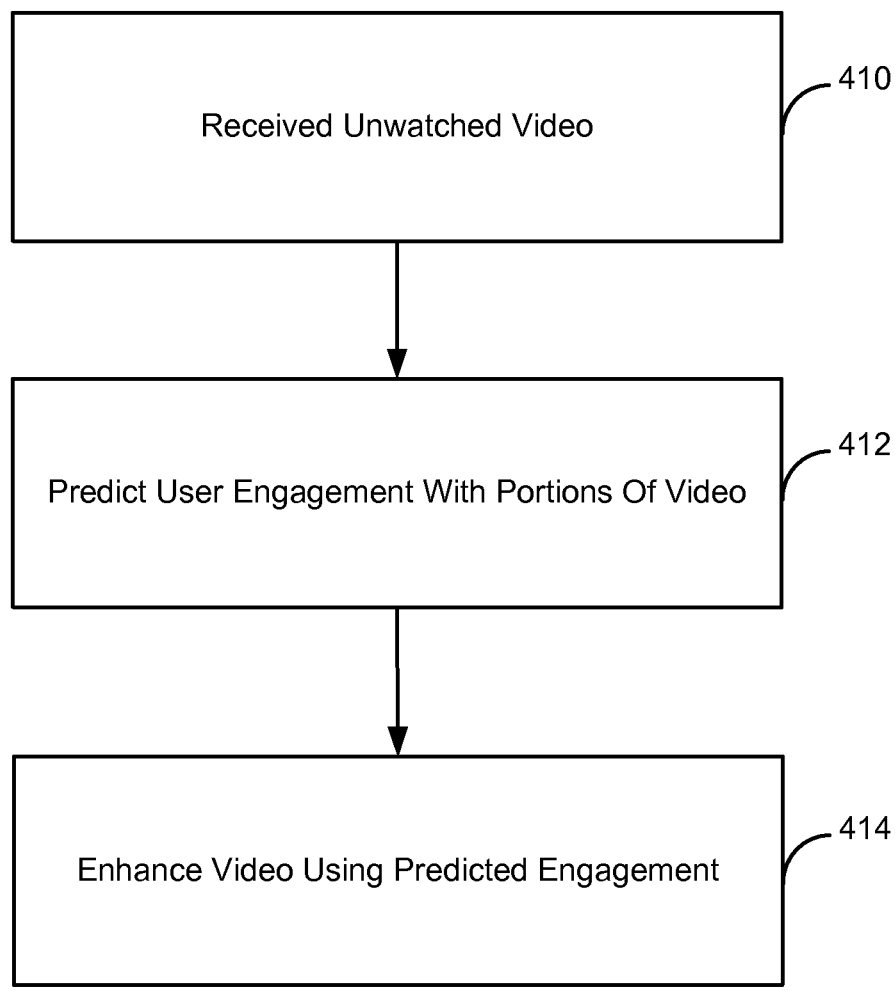
FIG. 4 illustrates the operation of the prediction server according to one embodiment.
Figure 5:
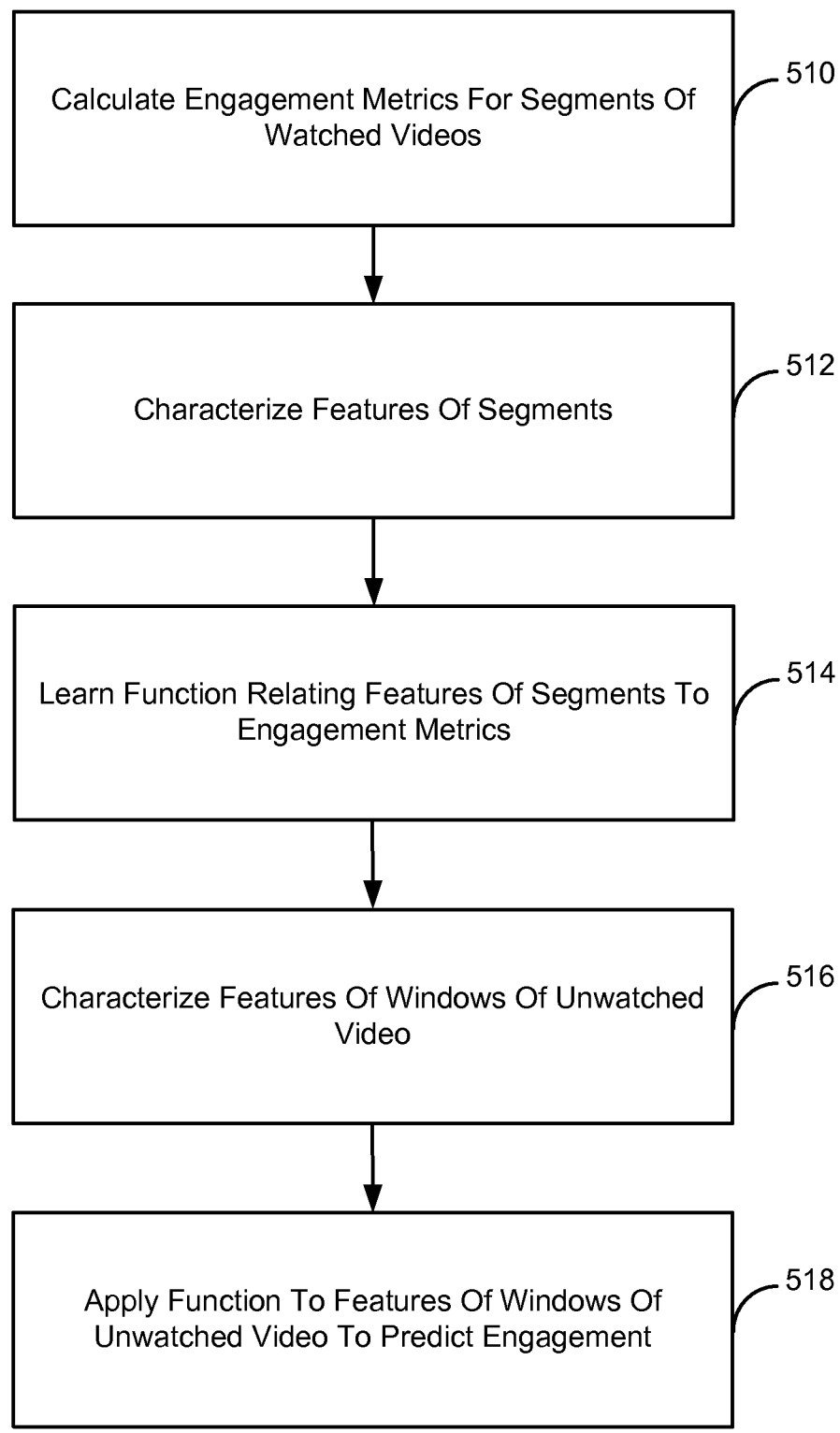
FIG. 5 illustrates steps involved in predicting user engagement with portions of the video as shown in step 412 of FIG. 4 according to one embodiment.
Figure 6:
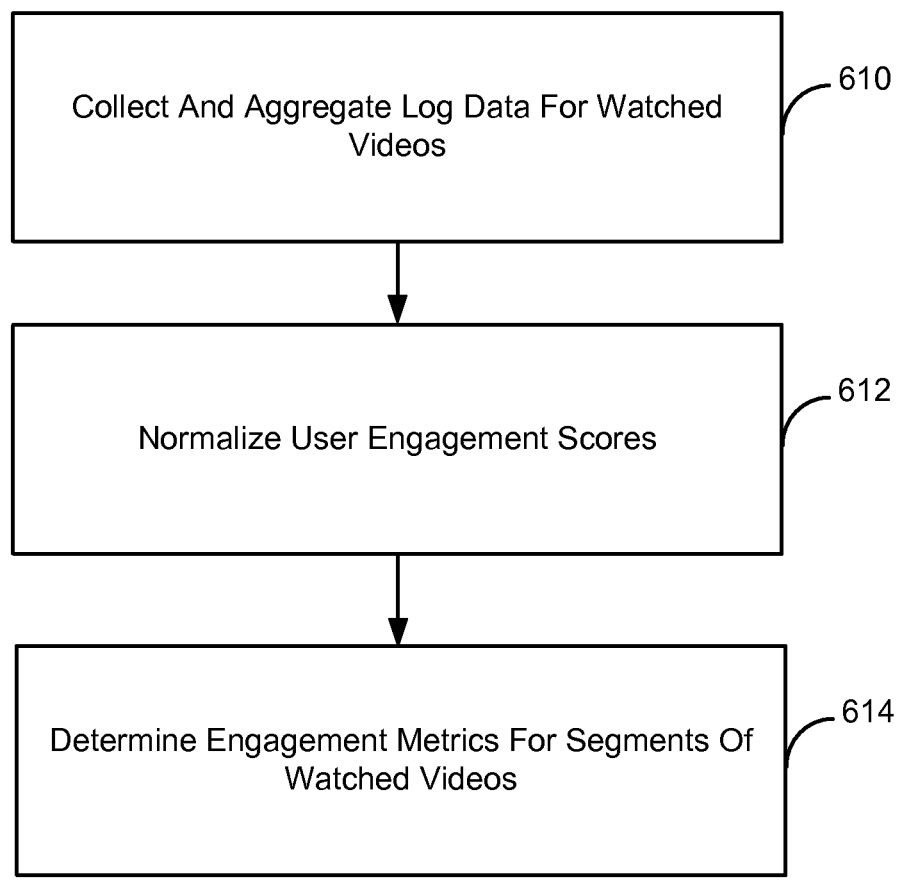
FIG. 6 illustrates steps involved in calculating engagement metrics for segments of watched videos as shown in step 510 of FIG. 5 according to one embodiment.

FIGS. 4-6 are flowcharts illustrating the operation of the prediction server 112 according to one embodiment. Different embodiments perform different and/or additional steps than those shown in the figures, and perform the steps in different orders. In addition, the steps can be performed by entities other than the prediction server 112, such as the video server 110.

FIG. 4 illustrates the operation of the prediction server 112 according to one embodiment. The server 112 receives 410 an unwatched video. For example, a user of a client 114 can upload a new video to the video server 110, and the video server 110 can provide the video to the prediction server 112. The prediction server 112 predicts 412 user engagement with portions of the video, such as with five second windows of the video. Next, the prediction server 414 uses the predicted engagement to enhance user experiences with the video by, for example, inserting engagement boosters during portions of predicted low engagement and capturing representative images and segments from portions of predicted high engagement.

FIG. 5 illustrates steps involved in predicting user engagement with portions of the video as shown in step 412 of FIG. 4 according to one embodiment. The prediction server 112 calculates 510 engagement metrics for segments of watched videos served by the video server 110. In addition, the prediction server 112 characterizes the features of windows of the video including the segments. In one embodiment, the prediction server 112 characterizes the features of a window by creating a feature vector describing various aspects of the audio and video content within the window.

The prediction server 112 learns 514 a function relating the features of the windows of the watched videos to the windows' engagement metrics. The learned function can be embodied as one or more classifiers that can examine a window of video and classify it has having a high or low engagement metric. In addition, the prediction server 112 characterizes 516 the features of windows of an unwatched video in a similar manner to how the features of the windows of watched video are characterized. The prediction server 112 applies 518 the learned function to the windows of the unwatched video to predict user engagement with the windows. While not explicitly shown in FIG. 5, the steps shown therein can be repeated as additional data about watched videos are received. For example, the learned function can be refined over time as additional log data about existing and new watched videos are accumulated and/or additional features of videos are recognized and characterized.

FIG. 6 illustrates steps involved in calculating engagement metrics for segments of watched videos as shown in step 510 of FIG. 5 according to one embodiment. The prediction server 112 collects and aggregates 610 log data for watched videos. In embodiment, a video player program provided to clients 114 by the video server 110 is instrumented to log data describing user interactions with videos and provide the data to the prediction server 112. The prediction server 112 aggregates the log data across multiple users to produce aggregated log data that describe the number of users who have viewed each segment of the videos.

The ratio of the number of viewers of a given segment to the number of viewers of the video containing the segment is the user engagement score for the segment. The prediction server 112 normalizes 612 the user engagement scores for the video segments to reduce the influence of factors other than video content on the scores. The prediction server 112 then uses the normalized engagement scores to determine 614 engagement metrics for the segments. One embodiment of the prediction server 112 calculates the engagement metrics by determining the mean engagement score of all segments under consideration, and then representing a segment's difference from the mean as that segment's engagement metric.

While this description focuses primarily on video content, the techniques described herein can also be applied to other types of content. For example, the techniques can be used to predict user engagement with audio content and still images.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of using a computer having one or more processors to predict user engagement, comprising:
the one or more processors accomplishing the steps of:
determining engagement metrics indicating user engagement with portions of a plurality of different watched videos;
characterizing inherent features of video content within the portions of the plurality of different watched videos, the characterizing comprising describing at least one of: frequency coefficients of a visual component of the content, spatial arrangement of color of a visual component of the content, visual texture of a visual component of the content, and motion of pixels in a visual component of the content;
determining a relationship between the characterized features of the content within the portions of the plurality of different watched videos and the engagement metrics of the portions of the plurality of different watched videos;
characterizing inherent features of video content within a portion of an unwatched video, the unwatched video not among the plurality of watched videos, the characterizing comprising describing at least one of: frequency coefficients of a visual component of the content, spatial arrangement of color of a visual component of the content, visual texture of a visual component of the content, and motion of pixels in a visual component of the content;
predicting an engagement metric for the portion of the unwatched video based at least in part on the characterized features of the content within the portion of the unwatched video and the determined relationship between the characterized features of the content within the portions of the plurality of different watched videos and the engagement metrics of the portions of the watched videos; and
storing the predicted engagement metric for the portion of the unwatched video.

2. The method of claim 1, wherein determining engagement metrics indicating user engagement with portions of a plurality of different watched videos comprises:
receiving data describing user interactions with the plurality of different watched videos;
aggregating the data describing the user interactions with the plurality of different watched videos to determine user engagement with the portions of the plurality of different watched videos;
normalizing the aggregated data to increase an influence of the content within the portions of the plurality of different watched videos on the user engagement and to reduce an influence of factors other than the content within the portions of the plurality of different watched videos on the user engagement; and
determining the engagement metrics for the portions of the plurality of different watched videos responsive to the normalized aggregated data describing the user interactions with the plurality of different watched videos.

3. The method of claim 2, wherein determining engagement metrics for the portions of the plurality of different watched videos served by the video server comprises:
determining a mean user engagement across the plurality of different watched videos; and
calculating the engagement metrics for the portions of the plurality of different watched videos responsive to differences between the user engagements for the portions and the mean user engagement.

4. The method of claim 1, wherein characterizing inherent features of video content within the portions of the plurality of different watched videos comprises:
identifying a time window of a watched video; and
computing a feature vector describing inherent characteristics of video content within the watched video within the identified time window.

5. The method of claim 1, wherein determining a relationship between the characterized features of the content within the portions of the plurality of different watched videos and the engagement metrics of the portions of the watched videos comprises:

associating characterized inherent features of video content within the portions of the plurality of different watched videos with the engagement metrics of the respective portions of the plurality of different watched videos; and using machine learning to learn a function relating the characterized inherent features of the video content within portions of the plurality of different watched videos to the engagement metrics of the portions of the plurality of different watched videos, the machine learning using the association between the characterized features and the engagement metrics as ground truth instances.

6. The method of claim 5, wherein using machine learning comprises:

identifying portions of the plurality of different watched videos having very high and/or very low user engagement metrics relative to engagement metrics of other portions of the watched videos; and training a classifier using the content within the identified portions of the watched videos having very high and/or very low user engagement metrics by using the content within the identified portions as ground truth labels for the classifier;

wherein predicting an engagement metric for the portion of the unwatched video uses the classifier to make the prediction.

7. The method of claim 1, further comprising:

enhancing the portion of the unwatched video responsive at least in part to the predicted engagement metric.

8. The method of claim 7, wherein enhancing the portion of the unwatched video comprises:

overlaying an advertisement on the portion of the unwatched video.

9. The method of claim 7, wherein enhancing the portion of the unwatched video comprises:

capturing and storing a representative image or video segment for the unwatched video from the portion of the unwatched video.

10. A non-transitory computer-readable storage medium storing executable computer program instructions for predicting user engagement, the computer program instructions comprising instructions for:

determining engagement metrics indicating user engagement with portions of a plurality of different watched videos;

characterizing inherent features of video content within the portions of the plurality of different watched videos, the characterizing comprising describing at least one of: frequency coefficients of a visual component of the content, spatial arrangement of color of a visual component of the content, visual texture of a visual component of the content, and motion of pixels in a visual component of the content;

determining a relationship between the characterized features of the content within the portions of the plurality of different watched videos and the engagement metrics of the portions of the plurality of different watched videos;

characterizing inherent features of video content within a portion of an unwatched video, the unwatched video not among the plurality of watched videos, the characterizing comprising describing at least one of: frequency coefficients of a visual component of the content, spatial arrangement of color of a visual component of the content, visual texture of a visual component of the content, and motion of pixels in a visual component of the content;

predicting an engagement metric for the portion of the unwatched video based at least in part on the characterized features of the content within the portion of the unwatched video and the determined relationship between the characterized features of the content within the portions of the plurality of different watched videos and the engagement metrics of the portions of the watched videos; and storing the predicted engagement metric for the portion of the unwatched video.

11. The computer-readable storage medium of claim 10, wherein determining engagement metrics indicating user engagement with portions of a plurality of different watched videos comprises:

receiving data describing user interactions with the plurality of different watched videos;

aggregating the data describing the user interactions with the plurality of different watched videos to determine user engagement with the portions of the plurality of different watched videos;

normalizing the aggregated data to increase an influence of the content within the portions of the plurality of different watched videos on the user engagement and to reduce an influence of factors other than the content within the portions of the plurality of different watched videos on the user engagement; and determining the engagement metrics for the portions of the plurality of different watched videos responsive to the normalized aggregated data describing the user interactions with the plurality of different watched videos.

12. The computer-readable storage medium of claim 10, wherein characterizing inherent features of video content within the portions of the plurality of different watched videos comprises:

identifying a time window of a watched video; and computing a feature vector describing inherent characteristics of video content within the watched video within the identified time window.

13. The computer-readable storage medium of claim 10, wherein determining a relationship between the characterized features of the content within the portions of the plurality of different watched videos and the engagement metrics of the portions of the watched videos comprises:

associating characterized inherent features of video content within the portions of the plurality of different watched videos with the engagement metrics of the respective portions of the plurality of different watched videos; and using machine learning to learn a function relating the characterized inherent features of the video content within portions of the plurality of different watched videos to the engagement metrics of the portions of the plurality of different watched videos, the machine learning using the association between the characterized features and the engagement metrics as ground truth instances.

14. The computer-readable storage medium of claim 13, wherein using machine learning comprises:

identifying portions of the plurality of different watched videos having very high and/or very low user engagement metrics relative to engagement metrics of other portions of the watched videos; and training a classifier using the content within the identified portions of the watched videos having very high and/or very low user engagement metrics by using the content within the identified portions as ground truth labels for the classifier;

wherein predicting an engagement metric for the portion of the unwatched video uses the classifier to make the prediction.

15. A computer system for predicting user engagement, the computer system comprising:
  a non-transitory computer-readable storage medium storing executable computer program instructions for predicting user engagement for a portion of an unwatched video, the computer program instructions comprising instructions for:
    determining engagement metrics indicating user engagement with portions of a plurality of different watched videos;
    characterizing inherent features of video content within the portions of the plurality of different watched videos, the characterizing comprising describing at least one of: frequency coefficients of a visual component of the content, spatial arrangement of color of a visual component of the content, visual texture of a visual component of the content, and motion of pixels in a visual component of the content;
    determining a relationship between the characterized features of the content within the portions of the plurality of different watched videos and the engagement metrics of the portions of the plurality of different watched videos;
    characterizing inherent features of video content within a portion of an unwatched video, the unwatched video not among the plurality of watched videos, the characterizing comprising describing at least one of: frequency coefficients of a visual component of the content, spatial arrangement of color of a visual component of the content, visual texture of a visual component of the content, and motion of pixels in a visual component of the content;
    predicting an engagement metric for the portion of the unwatched video based at least in part on the characterized features of the content within the portion of the unwatched video and the determined relationship between the characterized features of the content within the portions of the plurality of different watched videos and the engagement metrics of the portions of the watched videos; and
    storing the predicted engagement metric for the portion of the unwatched video; and
  a processor configured to execute the computer program instructions stored on the non-transitory computer-readable storage medium.

16. The computer system of claim 15, wherein determining engagement metrics indicating user engagement with portions of the plurality of different watched videos comprises:
  receiving data describing user interactions with the plurality of different watched videos;
  aggregating the data describing the user interactions with the plurality of different watched videos to determine user engagement with the portions of the plurality of different watched videos;
  normalizing the aggregated data to increase an influence of the content within the portions of the plurality of different watched videos on the user engagement and to reduce an influence of factors other than the content within the portions of the plurality of different watched videos on the user engagement; and
  determining the engagement metrics for the portions of the plurality of different watched videos responsive to the normalized aggregated data describing the user interactions with the plurality of different watched videos.

17. The computer system of claim 15, wherein determining a relationship between the characterized features of the content within the portions of the plurality of different watched videos and the engagement metrics of the portions of the watched videos comprises:
  associating characterized inherent features of video content within the portions of the plurality of different watched videos with the engagement metrics of the respective portions of the plurality of different watched videos; and
  using machine learning to learn a function relating the characterized inherent features of the video content within portions of the plurality of different watched videos to the engagement metrics of the portions of the plurality of different watched videos, the machine learning using the association between the characterized features and the engagement metrics as ground truth instances.

18. The method of claim 2, wherein normalizing the aggregated data comprises at least one normalization from the set of normalizations consisting of:
  decreasing an influence of long videos from among the plurality of different watched videos on user engagement;
  decreasing an influence of portions occurring very early in videos of the plurality of different watched videos on user engagement; and
  boosting or penalizing portions of the plurality of different watched videos responsive to whether engagement enhancements are included in the portions.

19. The method of claim 1, wherein predicting the engagement metric comprises:
  identifying a time window of the unwatched video;
  computing a feature vector describing characteristics of content within the unwatched video within the identified time window; and
  applying a machine-learned prediction function to the feature vector to predict user engagement with the content within the identified time window.

* * * * *